United States Patent
Braun et al.

(10) Patent No.: US 6,422,191 B1
(45) Date of Patent: Jul. 23, 2002

(54) LOW EVAPORATIVE EMISSIONS ENGINE MANAGEMENT SYSTEM

(75) Inventors: Charles Wilson Braun, Livonia; Kenneth William Turner, Mendon, both of NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/807,090

(22) PCT Filed: Aug. 16, 2000

(86) PCT No.: PCT/US00/22512

§ 371 (c)(1),
(2), (4) Date: Jun. 26, 2001

(87) PCT Pub. No.: WO01/12975

PCT Pub. Date: Feb. 22, 2001

Related U.S. Application Data
(60) Provisional application No. 60/149,125, filed on Aug. 16, 1999.

(51) Int. Cl.[7] .............................................. F02M 35/10
(52) U.S. Cl. .................. 123/184.21; 123/456; 123/572; 60/324
(58) Field of Search ................................ 123/456, 470, 123/184.21, 184.54, 336, 337, 518, 572; 60/324

(56) References Cited

U.S. PATENT DOCUMENTS

| | | | | |
|---|---|---|---|---|
| 4,422,416 A | * | 12/1983 | Bernardoni | 123/184.54 |
| 5,832,721 A | * | 11/1998 | Cullen | 60/274 |
| 5,918,580 A | * | 7/1999 | Hennrich et al. | 123/520 |
| 6,003,310 A | * | 12/1999 | Mayer et al. | 60/287 |

\* cited by examiner

*Primary Examiner*—Marguerite McMahon
*Assistant Examiner*—Hyder Ali
(74) *Attorney, Agent, or Firm*—John VanOphem

(57) ABSTRACT

An engine management system for an internal combustion engine for an automobile includes an architecture for a super ultra low evaporative emission capability. In the present architecture, the fuel rail and injectors are located within the intake manifold such that permeating and evaporative emissions are contained within the intake manifold and a sealing throttle body and/or shut-off check valve is located between the air cleaner/induction components and the throttle body prevent hydrocarbon emissions from reaching the atmosphere. Additionally, a shut-off valve and/or programmable valve train are included to prevent hydrocarbons from the PCV valve and fresh air supply line from being vented to atmosphere. A one way check valve is located between the air induction and cleaner and the PCV fresh air supply such that hydrocarbons that are produced within the intake manifold may pass into the PCV fresh air supply line.

12 Claims, 3 Drawing Sheets

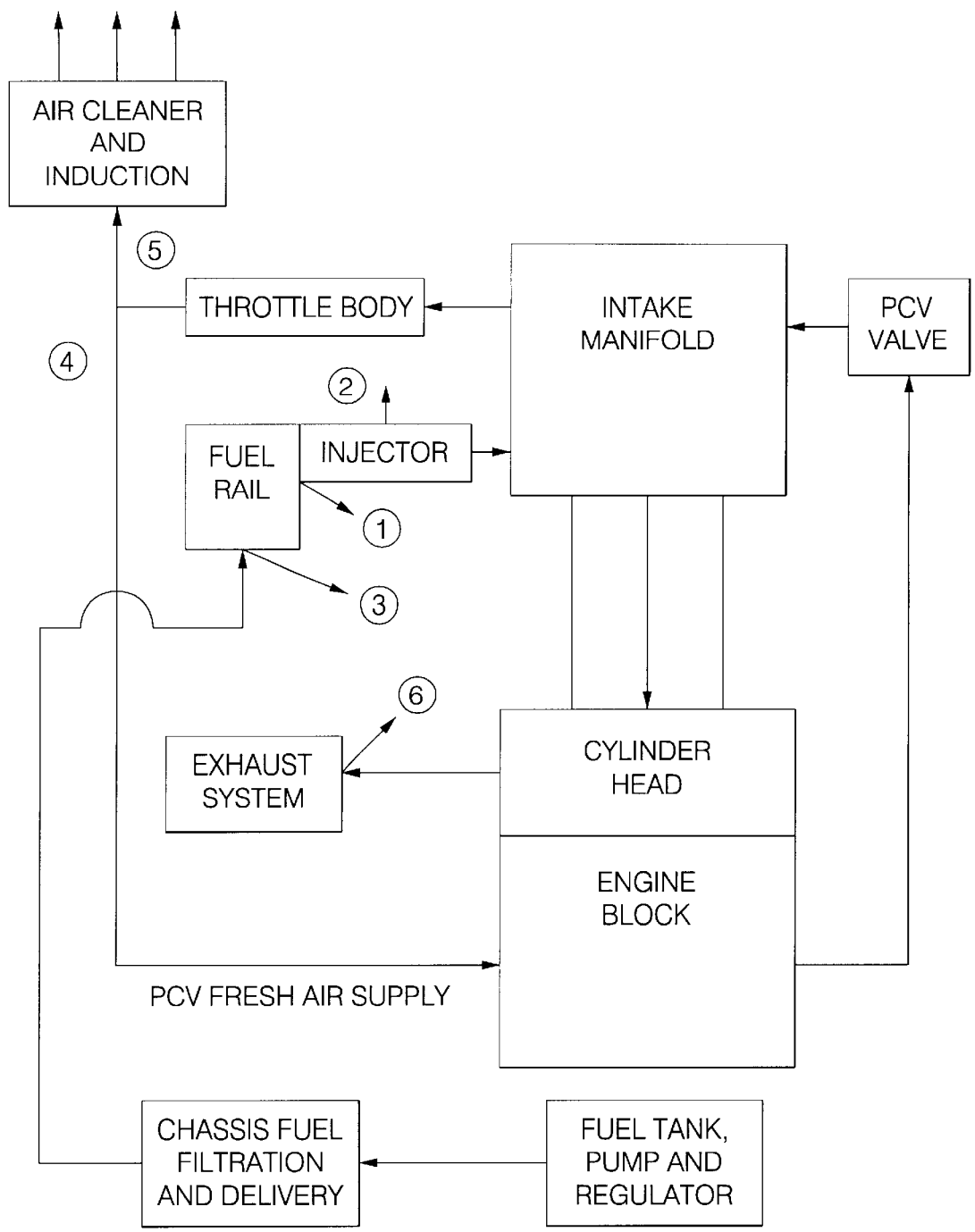

1. PERMEATION THROUGH THE INJECTOR-FULL TIME EVAPORATIVE EMISSION SITE
2. PERMEATION AT THE RAIL / INJECTOR O-RING-FULL TIME EVAPORATIVE EMISSION SITE
3. PERMEATION AT THE RAIL / FUEL LINE INTERFACE-FULL TIME EVAPORATIVE EMISSION SITE
4. FUEL VAPOR AND OTHER HYDROCARBONS FROM THE CRANK CASE ESCAPE THROUGH THE PCV FRESH AIR SUPPLY LINE, ONLY WHEN ENGINE IS OFF
5. HYDROCARBONS THAT ACCUMULATE IN THE INTAKE MANIFOLD FROM REVERSION, INJECTOR TIP LEAK, AND PCV VAPOR, ESCAPE THROUGH THE INDUCTION SYSTEM, ONLY WHEN ENGINE IS OFF
6. HYDROCARBONS THAT ACCUMULATE IN THE EXHAUST MANIFOLD FROM REVERSION, INJECTOR TIP LEAK, AND PCV

PRIOR ART
FIG. 1

LOW EVAPORATIVE EMISSIONS ENGINE MANAGEMENT SYSTEM

This application claims the benefit of provisional application No. 60/149,125 filed Aug. 16, 1999.

TECHNICAL FIELD

The present invention pertains to engine management systems such as those found on automobiles and more particularly to an engine management system that is capable of meeting super ultra low emissions vehicle requirements for evaporative emissions.

BACKGROUND OF THE INVENTION

Automobile manufacturers have gone to significant lengths to reduce emissions created by vehicles. Most automobiles contain many differing sources of emissions of various types. Manufacturers have pursued a number or these sources in an ad hoc manner. Two major classes of sources of emissions are the exhaust emissions, and evaporative emissions from other sites on the vehicle. Both classes of emissions include hydrocarbons or unburned fuel. The major source of unburned fuel is obviously the gasoline to be burned by the engine. In today's vehicles, fuel tanks are vented through carbon canisters so that hydrocarbons are removed form the gases vented from the fuel tank due to a pressure differential. The vapors from the fuel tank are stored in the carbon canister until the evaporative emission hydrocarbons can be pulled into the engine and burned in the combustion process.

The system described above is very effective at stopping fuel vapors escaping from the fuel tank. However there are no systems in place that address fuel permeating from other sites such as: the regulator diaphragm and regulator to rail interface seal; the seals at the rail/injector interface (all fuel rail seals that seal high pressure fuel including fuel rail cross-over pies and end plugs); the seals at the inlet and outlet to the rail; vapor losses form the crank case through the PCV system into the induction system; and vapor losses from dripping injectors, reversion, wall wetting or other sources of hydrocarbons that escape to the atmosphere from the intake manifold through the induction system, the EGR system (if present) and exhaust systems.

Further, it is known that hydrocarbon emissions loss can also result from fuel vapor molecules that permeate past plastic and elastomeric materials. In current fuel systems this includes "0" ring type seals, rubber or plastic fuel lines, plastic fuel rails and injectors, plastic fuel tanks, and the rubber fuel pressure regulator diaphragm. FIG. 1 shows the previously mentioned known components and system with arrows pointing outward to represent the fuel permeation losses.

A second type of emissions loss is migration losses. After the engine is shut off, some unburned fuel vapors exist in the engine's intake manifold and cylinder head. These vapors can migrate form the intake manifold past the throttle body and air cleaner to reach the atmosphere. Likewise, some hydrocarbon emissions from fuel may exist in the engine oil. Again, vapors from the engine oil in the crankcase can migrate through the PCV fresh air supply through the air cleaner reaching the atmosphere. Also, it is common and known that unburned hydrocarbons typically exist in the engine's exhaust system. These vapors may migrate through the exhaust system to reach the atmosphere.

A third source of emissions of hydrocarbon are fuel leaks at system component interfaces. The diagram shows the large number of interfaces that exist in a current system.

The above are generally small contributors to the total evaporative emission picture when looked at individually. However, in order to meet aggregate emission requirements, fuel system, engine suppliers, and vehicle manufacturers will have to reduce the number of permeation sites that can emit hydrocarbons. In other words the collective emissions of all these "uncontrolled" sites will have to be addressed.

SUMMARY OF THE INVENTION

Rather than optimizing each permeation site through extensive development, resulting in less service friendly metal connections or eliminating permeation sites, the present invention proposes another approach to contain the emissions escaping from these sites and use them as part of the normal combustion process.

The present invention relates to a manifold, fuel system and induction system architecture that contains fuel vapors that normally occur inside the intake manifold and prevents them from migrating to the atmosphere. The containment of hydrocarbons according to the present invention is achieved by the use of one or more shut-off devices in combination with strategically minimizes permeation sites by moving them inside the intake manifold where the aforementioned shut-off devices can also contain evaporative emissions form these sites.

BRIEF DESCRIPTION OF THE DRAWINGS

The present invention will now be described, by way of example, with reference to the accompanying drawings, in which:

FIG. 1 shows a conventional engine management system and conventional hydrocarbon leak paths.

DESCRIPTION OF THE PREFERRED EMBODIMENT

This invention relates to a manifold, fuel system and induction system architecture that effectively contains evaporative emissions within the intake manifold and prevents them from migrating to the atmosphere. The containment is achieved by the use of one or more shut-off devices strategically located in the induction system and/or exhaust system in combination with the location of a number of permeation sites inside the intake manifold.

The present invention is described in terms of an architecture that contains losses form the evaporative emission sites during periods of non-use and consumes evaporative emissions as part of the normal charge during the engine's operation.

Figure 2:
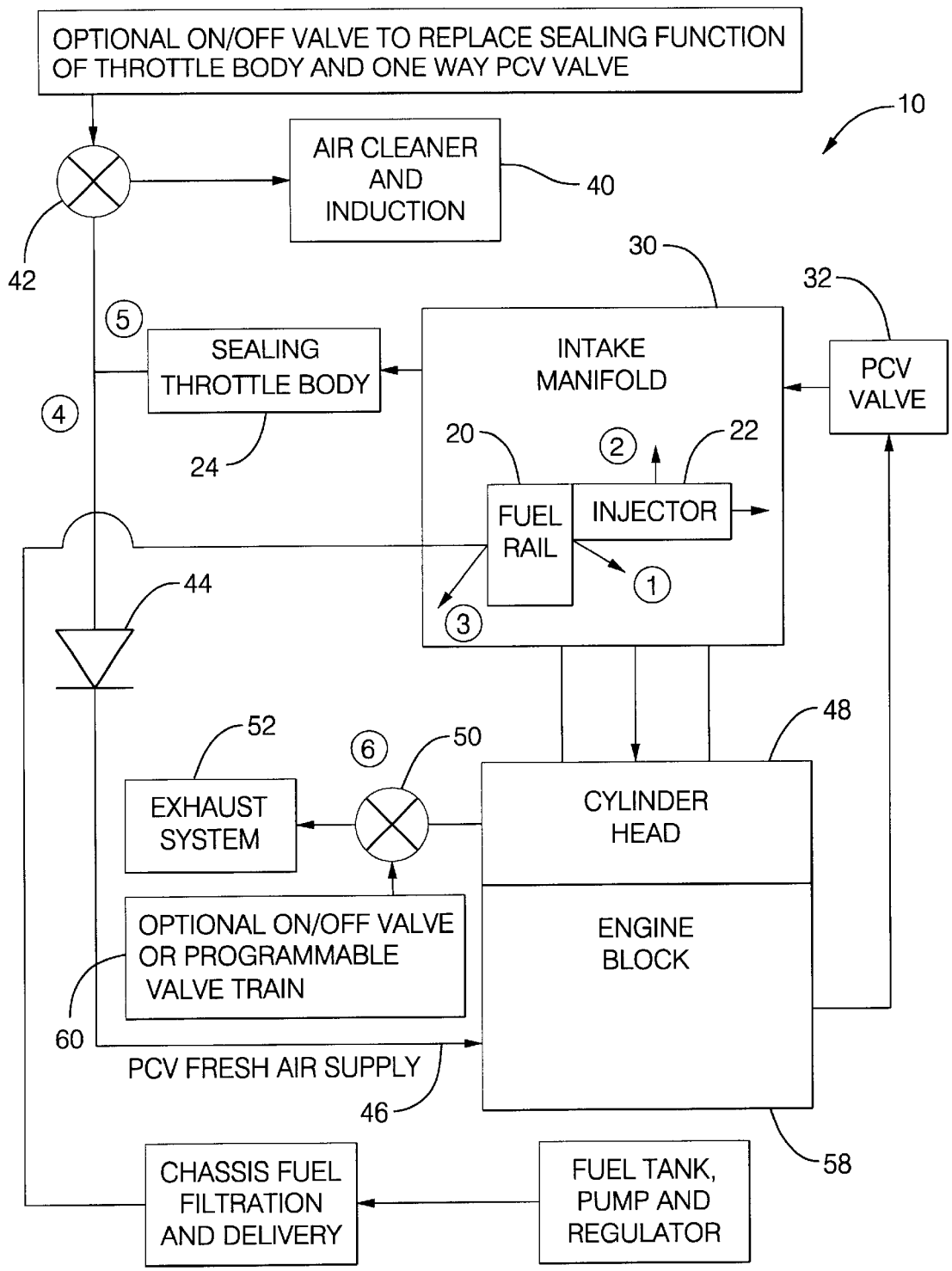
FIG. 2 shows an improved low emission engine management system according to the present invention.
Figure 3:
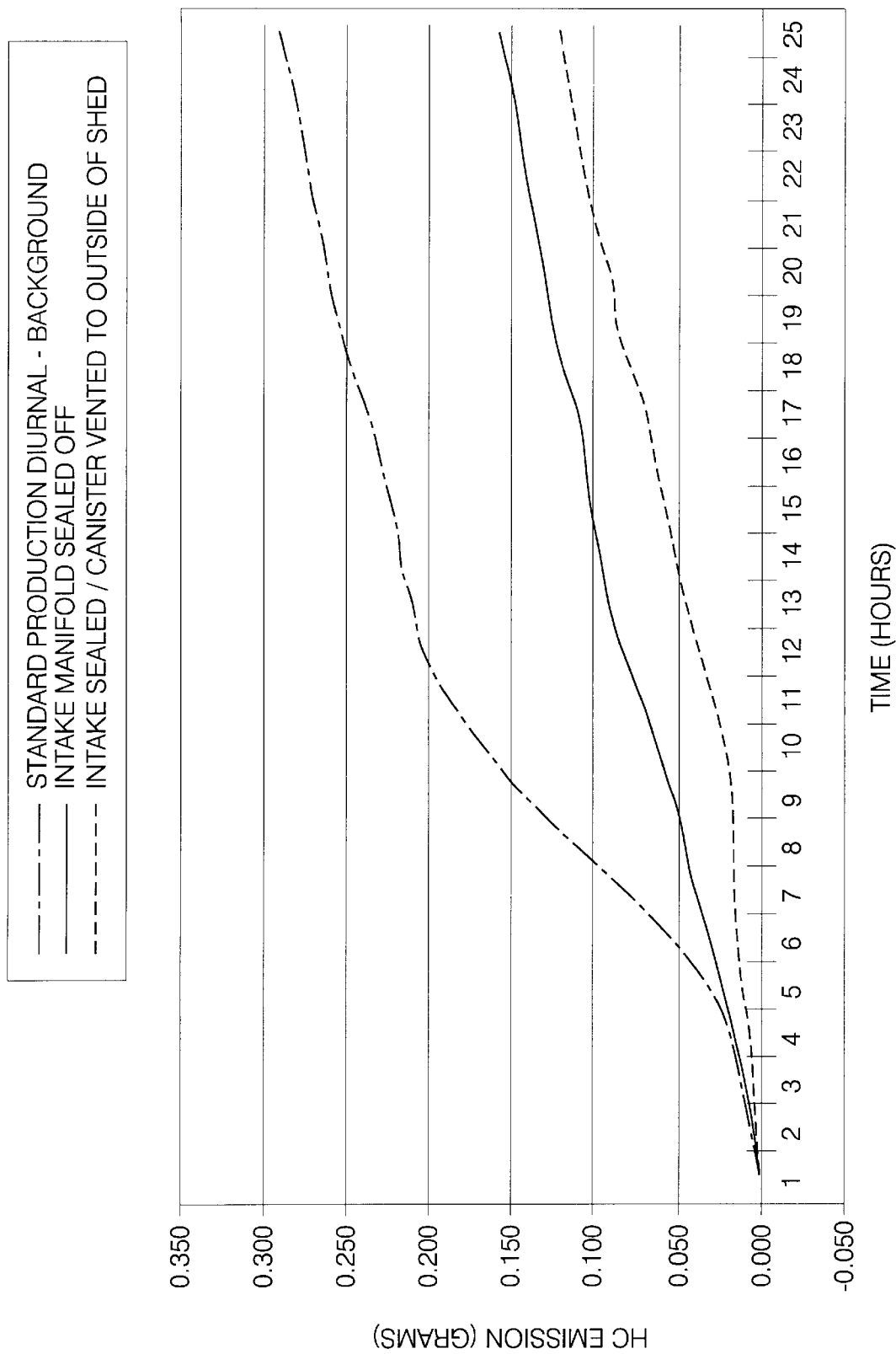
FIG. 3 shows comparative evaporative emissions performance between conventional engine management systems and a variously configured engine management systems according too the present invention.

FIG. 2 details an exemplary system or architecture 10 according to the present invention for controlling the hydrocarbon migration and permeation sources 1 through 6 that are part of the engine fuel system. In particular, it should be noticed that the fuel rail 20 and the fuel injectors 22 are located inside the intake manifold 30. This location of the fuel rail 20 and fuel injectors 22 contains the hydrocarbons that permeate or drip from these components inside the intake manifold 30. Then, to control the vapors inside the intake manifold 30 which could migrate through the throttle body and air cleaner 40 to atmosphere, a sealed throttle body 24 is utilized or a controllable valve 42 that would be located between the throttle body and air cleaner is alternately used. It is possible that both a sealed throttle body 24 and a controllable valve 42 are used. Notwithstanding, the objective of each option is to block vapor migration from the intake manifold to atmosphere.

In the present invention the fuel system (i.e., fuel rail 20 and injectors 22) is mounted internal to the intake manifold 30, in such a way that fuel permeating from its seals or through other surfaces (as shown by reference numerals 1, 2 and 3 in FIG. 2) through which fuel can readily permeate, such as composite materials and elastomers, enters the intake manifold 30 rather than being discharged directly to atmosphere. The fuel line to rail 20 connections will be made inside the intake manifold 30 such that permeation from these seals also enters the intake manifold 30. These hydrocarbons mix with the air in the intake manifold 30 and are continually used in the combustion process when the vehicle is in use. During periods of non-use the permeating fuel mixes with the air in the intake manifold 30 and hydrocarbons form other sources such as fuel dripping form injectors 22, fuel blown into the intake manifold 30 during the reversion pules, hydrocarbons in the PCV vapors and injector spray wall wetting.

Known production systems do nothing to prevent hydrocarbons in the intake manifold 30 from escaping to the atmosphere during periods of non-use. Hydrocarbons in the intake manifold are driven into the atmosphere by the expansion and contraction of the weak air/fuel mixture in the intake manifold 30 due to temperature changes that occur during engine cool-down and diurnal temperature cycling (naturally occurring or forced temperature fluctuations that occur during a 24 hour period).

In the proposed architecture 10, the sealing throttle body 24 is used to prevent these hydrocarbon molecules from migrating to the atmosphere through the induction system 40. To prevent hydrocarbons from escaping through the PCV fresh air inlet 46, a one way flow control device 44 is used (e.g., a read valve, a check valve, etc.). An alternate embodiment would be to use a controllable on/off valve in the induction system upstream of a conventional throttle body and PCV system fresh air inlet (for example on the dirty side of the air cleaner to allow use of a carbon layer in the air cleaner to absorb hydrocarbons). Any type of valve/ actuator combination could be employed for this purpose (e.g., a poppet, butterfly or gate valve that is activated by a vacuum motor, DC motor, solenoid, or hydraulic actuator). To prevent hydrocarbons form migrating from the intake manifold 30 out through the exhaust system 52 if an intake/ exhaust valve overlap condition occurs, an exhaust shut off valve or a programmable valve train 50 can be used.

It should be noted that this same technique can be employed to address hydrocarbons that exist in the intake manifold 52 in cases where the fuel system is mounted outside the intake manifold 30 except that fuel system permeation will not be addressed. The following hardware is desirable for the system 10 according to the present invention: a sealing throttle body 24 and/or induction system shut-off valve; a one way or controlled PCV system (32, 46, 44); and an exhaust shut-off valve (or "parking valve train") 50.

To control fuel vapors which are a result of fuel mixed with the engine oil, preferably the one way flow valve 44 is located in the PCV fresh air line in line with the shut-off valve 42 located between the throttle body 24 and the air cleaner 40. The PCV fresh air line 46 is connected between the shut-off valve 42 and the throttle body 24 in order to contain the hydrocarbon emissions from the various sources.

The exhaust shut-off valve 50 located between the engine (including the cylinder head 48 and engine block 58) and the exhaust system 52. Alternatively, the exhaust valve 52 could be located between the exhaust system 52 and atmosphere to block a potential source of unburned fuel vapors migrating to the atmosphere.

While the present invention has been set forth in terms of a preferred embodiment, it will be understood by a person of ordinary skill in the art to which the present invention pertains that changes can be made to the above system, beyond those contemplated by herein without departing from the scope of the invention which shall only be limited by the following claims.

What is claimed is:

1. An engine architecture for an internal combustion engine, the engine including an intake manifold, a cylinder head, an induction system, a throttle body, fuel rail, injector, the architecture being designed to control and prevent the evaporative emissions of hydrocarbons, the architecture comprising:

a sealing throttle body communicating with the intake manifold and the induction system;

an operative shut off valve located between the sealing throttle body and the induction system to prevent hydrocarbons from being emitted out the induction system; and wherein the fuel rail and the injectors are located within the intake manifold such that any evaporative emissions from the fuel rail and the injectors is contained within the intake manifold and can be used in the combustion process.

2. An engine architecture according to claim 1 wherein the engine further includes a PCV fresh air supply line and a PCV valve, the architecture further comprising a one way check valve connected in the PCV fresh air supply line.

3. An engine architecture according to claim 1 wherein the engine further includes a PCV fresh air supply line, a PCV valve and an exhaust system, the architecture further comprising:

a one way check valve connected in the PCV fresh air supply line; and;

a shut-off valve connected between the exhaust system and the engine for closing the exhaust system to selectively prevent hydrocarbon emissions when the engine is not operating.

4. An engine architecture according to claim 1 wherein the engine further includes a PCV fresh air supply line, a PCV valve and an exhaust system, the architecture further comprising:

a one way check valve connected in the PCV fresh air supply line; and a programmable valve train for closing the connection between the exhaust system and the engine for closing the exhaust system to selectively prevent hydrocarbon emissions when the engine is not operating.

5. An engine architecture according to claim 1 wherein the engine further includes an exhaust system, the architecture further comprising a shut-off valve connected between the exhaust system and the engine for closing the exhaust system to selectively prevent hydrocarbon emissions when the engine is not operating.

6. An engine architecture according to claim 1 wherein the engine further includes an exhaust system, the architecture further comprising a programmable valve train for closing the connection between the exhaust system and the engine for closing the exhaust system to selectively prevent hydrocarbon emissions when the engine is not operating.

7. An engine management system for an engine, the engine including a fuel supply, an intake manifold connected to a cylinder head attached to an engine block and an induction system, the engine management system comprising:

a one way check valve connected between the intake manifold and the induction system and operable to prevent hydrocarbon emissions from escaping to atmosphere; and wherein the engine further includes an injector located within the intake manifold such that hydrocarbon emissions from the injector are contained within the intake manifold.

8. An engine management system according to claim 7 wherein the engine further includes a PCV fresh air supply line and a PCV valve interconnecting the intake manifold and the engine block, the engine management system further comprising a one way check valve connected in the PCV fresh air supply line.

9. An engine management system according to claim 7 wherein the engine further includes a PCV fresh air supply line, a PCV valve and an exhaust system, the engine management system further comprising:

a one way check valve connected in the PCV fresh air supply line; and a shut-off valve connected between the exhaust system and the engine for closing the exhaust system to selectively prevent hydrocarbon emissions to the atmosphere when the engine is not operating.

10. An engine management system according to claim 7 wherein the engine further includes a PCV fresh air supply line, a PCV valve and an exhaust system, the engine management system further comprising:

a one way check valve connected in the PCV fresh air supply line; and a programmable valve train for closing the connection between the exhaust system and the engine for closing the exhaust system to selectively prevent hydrocarbon emissions when the engine is not operating.

11. An engine management system according to claim 7 wherein the engine further includes an exhaust system, the engine management system further comprising a shut-off valve connected between the exhaust system and the engine for closing the exhaust system to selectively prevent hydrocarbon emissions when the engine is not operating.

12. An engine management system according to claim 7 wherein the engine further includes an exhaust system, the engine management system further comprising a programmable valve train for closing the connection between the exhaust system and the engine for closing the exhaust system to selectively prevent hydrocarbon emissions when the engine is not operating.

* * * * *

UNITED STATES PATENT AND TRADEMARK OFFICE
CERTIFICATE OF CORRECTION

PATENT NO.    : 6,422,191 B1
DATED         : July 23, 2002
INVENTOR(S)   : Charles W. Braun et al.

It is certified that error appears in the above-identified patent and that said Letters Patent is hereby corrected as shown below:

Title page,
Item [75], Inventors, should read as follows:
-- [75] Inventors:    Charles Wilson Braun, Livonia, NY;
                      Kenneth William Turner, Mendon, NY;
                      Daniel F. Smith, Conesus, NY;
                      Keith A. Confer, Flushing, MI, (US), as joint inventors --

Signed and Sealed this

Twenty-sixth Day of October, 2004

JON W. DUDAS
*Director of the United States Patent and Trademark Office*